United States Patent [19]
Jansen, Jr.

[11] 4,057,267
[45] Nov. 8, 1977

[54] FLUID CONTROLLED PIPE CONNECTORS

[75] Inventor: Martin B. Jansen, Jr., Ventura, Calif.

[73] Assignee: Vetco Offshore Industries, Inc., Ventura, Calif.

[21] Appl. No.: 658,417

[22] Filed: Feb. 17, 1976

[51] Int. Cl.² .............................................. F16L 35/00
[52] U.S. Cl. ....................................... 285/18; 285/85; 285/308; 285/DIG. 21
[58] Field of Search ................... 285/18, DIG. 21, 85, 285/86, 308, 315, 321; 166/.6

[56] References Cited
U.S. PATENT DOCUMENTS

| | | | |
|---|---|---|---|
| 3,155,401 | 11/1964 | Musolf | 166/.6 X |
| 3,228,715 | 1/1966 | Neilon et al. | 285/315 X |
| 3,455,578 | 7/1969 | Hanes | 285/18 |
| 3,695,633 | 10/1972 | Hanes | 285/18 |
| 3,851,897 | 12/1974 | Piazza et al. | 285/DIG. 21 X |

Primary Examiner—Werner H. Schroeder
Assistant Examiner—Conrad L. Berman
Attorney, Agent, or Firm—Bernard Kriegel; Philip Subkow

[57] ABSTRACT

Pipe connectors particularly useful in securing sections of an underwater marine riser together, including a pin received in a box which are secured to one another by a plurality of lock dogs mounted in the box and movable radially inwardly against a portion of the pin by fluid actuated pistons to force the pin and box firmly together, the dogs being retained in position by fluid operated lock pistons. The lock pistons are operated by fluid pressure to shift them to an unlocking position, the fluid actuated pistons being operated by fluid pressure to shift the dogs outwardly and disconnect the pin and box from each other.

18 Claims, 18 Drawing Figures

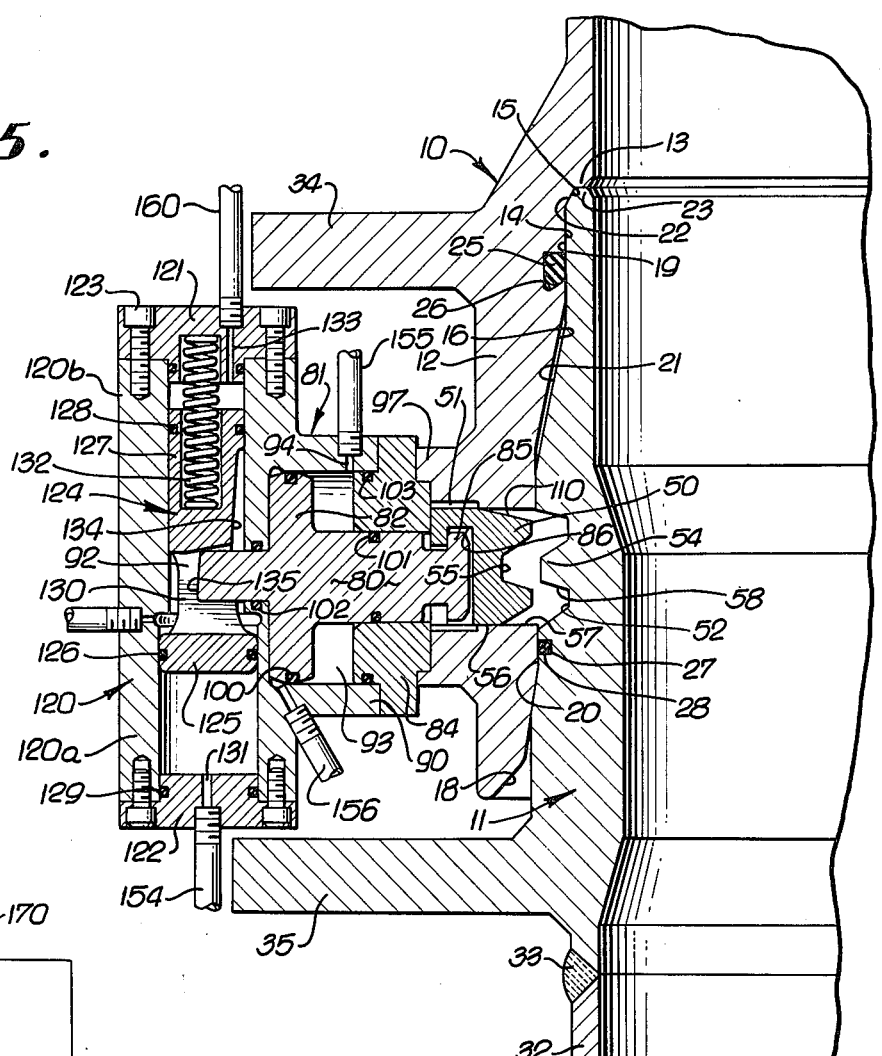
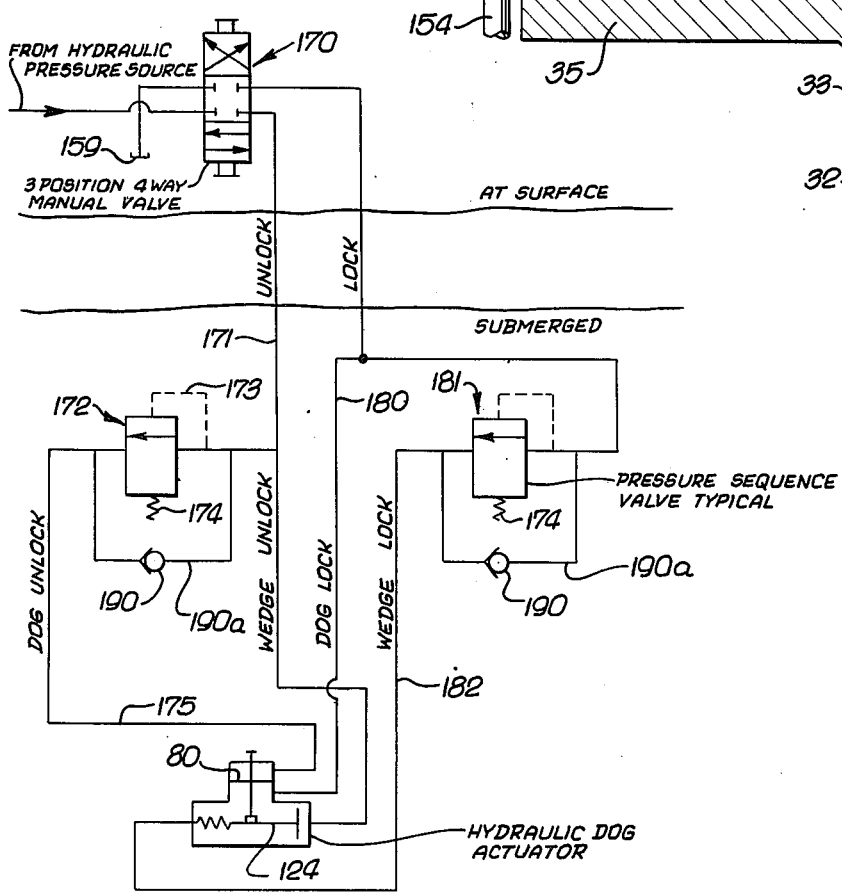

FLUID CONTROLLED PIPE CONNECTORS

The present invention relates to connectors and more particularly to connectors for securing adjacent pipe sections together, such as pipe sections forming parts of underwater marine risers used in drilling underwater bore holes.

Connectors used for securing sections of marine riser conduit together are illustrated in U.S. Pat. Nos. 3,606,393; 3,827,728; and in U.S. application Ser. No. 644,719 filed Dec. 29, 1975. (Attorneys' docket No. 4451) In such patents and application, the pin and box of the connector are secured together through an intervening lock or locks, leakage of fluid between the pin and box being prevented by one or more suitable elastomer side seals. In U.S. Pat. No. 3,827,728 and in the above patent application, the pin and box portions of each connector are rigidly secured to one another and will remain in that condition under relatively large tensile loads, or under large bending loads, as well as under a combination of both large bending and tensile loads applied simultaneously. The originally secured condition will remain despite the fact that the marine risers are located in relatively deep water as, for example, in water depths exceeding 5,000 feet. The marine riser becomes heavier with increased vertical lengths, slower to run into place and to remove from its location with attendant hazards.

In the above patents and patent application, the pin and box are secured together by the rotation of screws threadedly mounted in the box to effect shifting of a lock device, such as a plurality of dogs or a lock ring, into appropriate coupling relating to the pin. The lock members or lock ring are returned to the respective positions released from the pin by rotating the screws in the reverse direction to shift the screws in an outward direction in the box. In the above patents, the screws are retained in their position effecting securing of the pin and box to each other by suitable mechanical lock devices, preventing reverse rotation or loosening of the screws, the lock devices being released when the screws are reversely rotated. Thus, the inward threading of the actuator screws and their unthreading are performed by personnel applying suitable tools to the lock devices and screws.

By virtue of the present invention, the lock member or lock members are remotely actuated to effect coupling of the pin and box to each other and also to effect their uncoupling from each other. Additionally, lock devices for retaining the lock member or lock members in their position coupling the pin and box together are remotely actuated, and also remotely released when their shifting to unlocked position is desired.

More specificaly, the invention contemplates the provision of fluid actuated devices, such as hydraulic pistons and cylinder actuating devices controlled from a remote point for shifting the lock members or member to their coupling position, and also the provision of fluid operated devices, such as hydraulic piston and cylinder lock devices, controlled from a remote point for locking the fluid actuated devices and retaining the lock member or members in their position coupling the pin and box to each other. Similarly, the remotely controlled fluid operated devices can effect unlocking of the fluid actuated devices, whereupon the remotely controlled fluid actuated devices can be operated to release the lock member or members from their position coupling the pin and box to each other.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense. Referring to the drawings:

FIG. 5 is a view similar to FIG. 3, disclosing the coupling in its released condition, permitting separation between the pin and box portions of the connector;

FIG. 7 is a diagrammatic view of another embodiment of a specific hydraulic circuit for effecting locking and unlocking of the connector.

Figure 1:
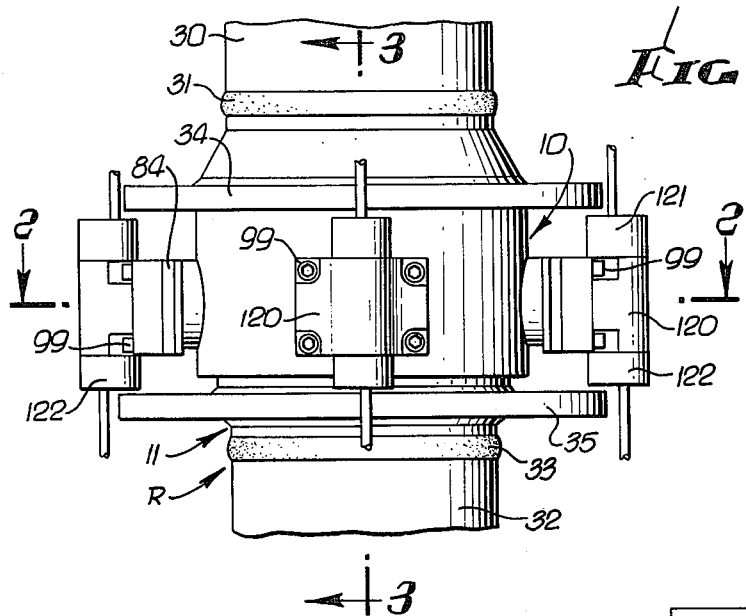
FIG. 1 is a side elevational view of a connector embodying the invention for coupling upper and lower conduit sections to one another.

As illustrated in the drawings, a marine riser R is provided that includes an external or box member 10 adapted to be telescoped over a companion pin member 11. The box member includes a skirt portion 12 and has a downwardly facing shoulder 13 normal to its axis A, an upper cylindrical wall 14 terminating below the box shoulder, with a upwardly tapering seat 15 intervening between the upper end of the cylindrical wall and the transverse box shoulder 13. The box member further includes an intermediate or tapered inner wall 16 extending downwardly and outwardly from the upper cylindrical wall, which terminates in a lower cylindrical wall 17 from which a downwardly flowing mouth 18 extends, which is provided in a lower portion of the box member.

The pin member 11 extends upwardly within the box member 10, having upper and lower external cylindrical walls 19 and 20 and a tapered external wall 21 therebetween, all of which are companion to the internal walls 14, 17, and 16 in the box member. In addition, the upper portion of the pin member has an externally and upwardly tapered surface 22 companion to the tapered seat 15 of the box member, and also a terminal or end 23 normal to the axis A of the connector, but slightly axially spaced from the box shoulder 13 when the tapered surfaces 22, 15 on the pin and box members initially engage. As described in U.S. Pat. No. 3,827,728, continued upward force imposed upon the pin member 11 will cause it to shift upwardly along the tapered surface 15 of the box member to deflect the upper portion 24 of the pin member inwardly, as limited by bottoming or engaging of the terminus 23 of the pin against the box shoulder 13. Normally, fluid leakage between the pin and box members is prevented by an upper elastomer seal 25 disposed within an internal circumferential groove 26 in the box member and bearing against the external cylindrical surface 19 of the pin member, and also by a lower elastomer seal ring 27 in an external circumferential groove 28 in the pin member 11 bearing against the internal cylindrical surface 17 of the box member.

As disclosed in the drawings, the upper end of the box member 10 is connected to an upper conduit section 30 by a suitable weld 31 extending circumferentially therearound. Similarly, the lower end of the pin member 11 is secured to a lower conductor or pipe section 32 by a circumferentially continuous weld 33 extending therearound. As specifically disclosed in the drawings, the box member and the pin member have longitudinally spaced horizontal flanges 34 and 35, which serve to protect the mechanism described hereinbelow for coupling the pin and box members to one another, and which may also serve as the supports for choke-kill lines (not shown) that can extend along the exterior of the marine riser.

The pin and box members 11, 10 are secured together against longitudinal relative movement by a plurality of circumferentially spaced horizontal lock members or dogs 50 disposed in openings or windows 51 in the box member 10 and adapted to be shifted inwardly into one or more circumferentially continuous external grooves 52 in the pin member 11. Each dog is of substantial arcuate extent, having one or more inwardly directed rib portions 53 adapted to move within the external grooves 52 of the pin member, the intervening rib portion 54 on the pin member being adapted to be received within a groove 55 formed between the lock dog ribs. The dogs are circumferentially spaced from one another, being of a suitable number, such as the four illustrated in the drawings, and having top and bottom parallel surfaces 56 adapted to move radially within its window 51 in engagement with companion top and bottom surfaces 57 of the window.

Each dog is adapted to occupy a completely retracted or outward position in which its ribs are disposed entirely within the confines of the window 51. Each dog can be shifted radially inwardly to cause its ribs 53 to move into the pin member grooves 52 and into engagement with the upper sides 58 of the grooves. The dogs can also be shifted radially outwardly to remove the ribs 53 from the pin member grooves 52 (FIG. 5) to permit the pin and box members 11, 10 to be separated from one another. The inward and outward movement of each dog is obtained by suitably connecting it to a fluid operated member, such as the piston structure 80 shiftable radially of the pin and box members within a cylinder structure 81. The piston structure includes a piston 82 integral with an inner piston rod 83 slidable within an inner cylinder head 84, the innermost portion of the piston rod having a thrust head 85 separated from the remaining portion of the piston rod by a smaller diameter intervening portion 85a. The piston rod 83 can be moved upwardly of the dog 50 into a T-shaped dog slot 86, with the smaller inward portion positioned in the smaller portion of the slot, and the head 85 moving within a larger portion of its T-shaped slot 86. The inner surface of the thrust head 85 can bear against the base 87 of the T-shaped slot, whereas an outer surface 88 of the thrust head is engageable with opposed outer rib portions 89 of the dog. Inward movement of the piston structure 80 will engage the thrust head 85 with the base 87 of the dog to shift the dog 50 inwardly, whereas outward movement of the piston structure 80 will cause the thrust head to engage the outer rib portions 89 and correspondingly shift the dog in an outward direction.

The cylinder structure 81 includes the inner cylinder head 84 described above, a cylinder 90 in which the piston 82 is slidable, and an outer cylinder head 91 in which an outer piston rod 92 is slidable, the piston rod being integral with the piston 82. Fluid, such as hydraulic fluid, can enter the cylinder space 93 between the piston 82 and the inner cylinder head 84 through a dog unlock or release passage 94 in the cylinder for the purpose of shifting the piston structure 80 in a radial outward direction, thereby causing the thrust head 85 to correspondingly shift the dog 50 in an outward direction to the position disclosed in FIG. 5. The introduction of fluid under pressure through a dog lock passage 5 in the cylinder will feed fluid under pressure, such as the hydraulic fluid, into the cylinder space 96 between the piston 82 and the outer cylinder head 91, to force the piston structure 80 in a radial inward direction to shift the dog 50 inwardly of the pin 11, or to a position securing the pin 11 and box 11 to each other.

Figure 4:
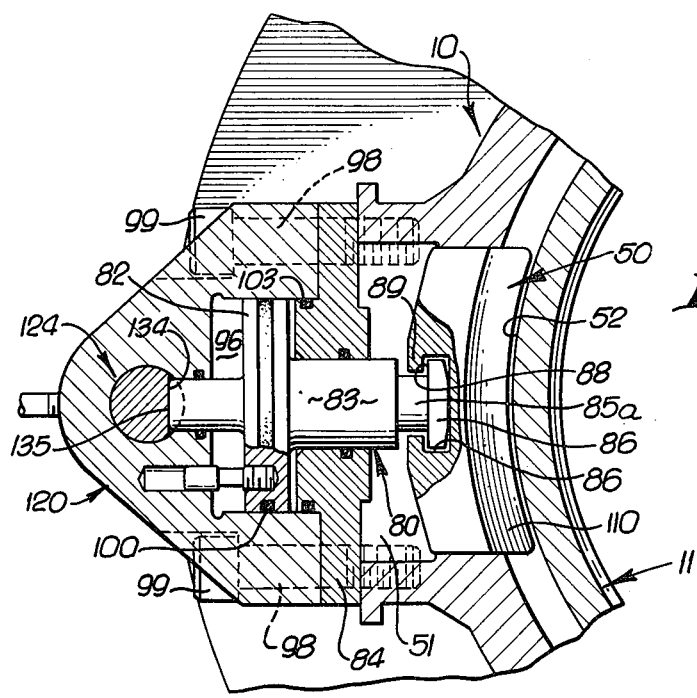
FIG. 4 is a section taken along the line 4—4 on FIG. 3.

The cylinder 90 and inner cylinder head 84 are secured to a boss 97 integral with the box member 10 by a plurality of screws 98 (FIG. 4) extending through the cylinder and the inner cylinder head and threaded into the boss. Tightening of the screws will cause the screw heads 99 to bear against the cylinder 90 and clamp the inner cylinder head 84 firmly between the cylinder and the boss. Leakage of fluid from the inner and outer cylinder spaces is prevented by a suitable seal ring 100 on the piston slidably and sealingly engaging the inner wall of the cylinder 90, by a seal ring 101 mounted on the inner piston rod 83 slidably and sealingly engaging the inner surface of the inner cylinder head 84, by a seal ring 102 mounted in the outer cylinder head 91 and sealingly engaging the outer piston rod 92, and by a seal ring 103 mounted on the inner cylinder head 84 and engaging the inner wall of the cylinder. The seals on the piston and inner cylinder head are disposed on opposite sides of the dog unlock or release passage 94, the seals on the piston and outer cylinder head being disposed on opposite sides of the dog lock passage 95.

Figure 3:
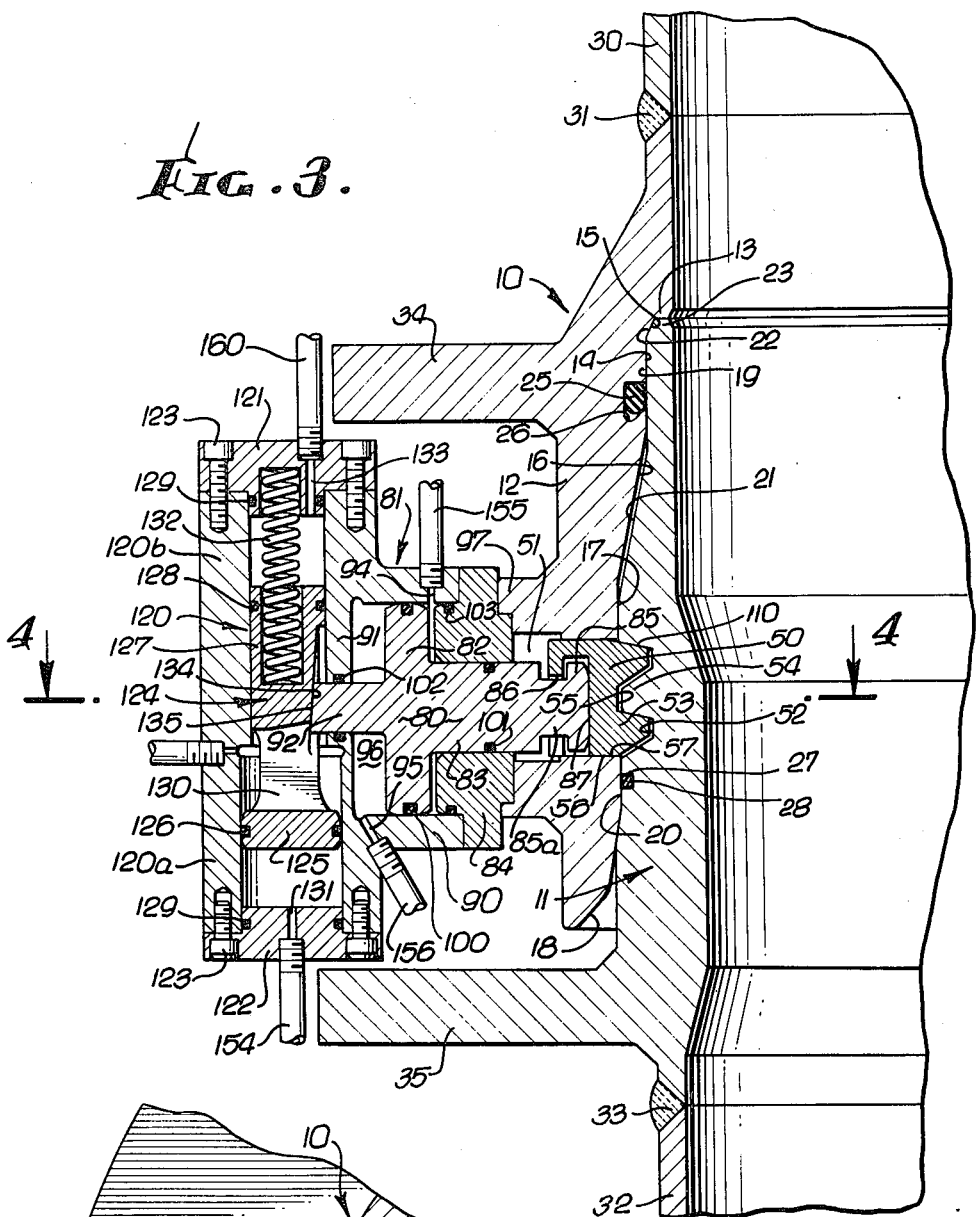
FIG. 3 is a partial longitudinal section, on an enlarged scale, taken along the line 3—3 on FIG. 1, disclosing the pin and box of the connector coupled to each other and locked in such coupled condition.

The introduction of fluid under pressure into the dog lock passage 95 will shift the piston structure 80 in an inward direction and force the dog 50 into the pin grooves 52. The tapered or inclined cam surfaces 110 on each dog engage the companion tapered or cam surfaces 58 on the pin 11 to force the pin axially further inwardly into the box until the end 23 of the pin bears against the box shoulder 13 (FIG. 3). The relieving of the fluid pressure in the outer cylinder space 96 and its introduction through the dog unlock or release passage 94 will shift the piston structure 80 in the opposite direction, carrying the dog 50 outwardly completely from the pin grooves and into the fully retracted position within the confines of the box 10 illustrated in FIG. 5, which then permits removal of the box from the pin.

A wedge lock cylinder 120 is formed integral with each dog lock cylinder 81, its axis being normal to the latter. An upper cylinder head 121 closes one end of wedge lock cylinder, a lower cylinder head 122 closing the other end of the cylinder, both heads being suitably secured to the wedge lock cylinder by screws 123, or the like. A piston structure 124 is slidable in the cylinder 120, including a lower piston 125 having a seal ring 126 slidably engageable with the companion wall of the lower cylinder portion 120a. An upper piston portion 127 slides within an upper cylinder portion 120b and has a seal ring 128 slidably and sealingly engaging the wall of the upper cylinder portion. Seals 129 are provided on the upper head 121 and the lower head 122 for sealing engagement with the upper and lower cylinder portions 120b, 120a to prevent leakage along the cylinder heads.

The wedge lock piston structure 124 can occupy an upper position when the actuating piston structure 80 and its dog 50 are in their outward or retracted position, as disclosed in FIG. 5, at which time the outer piston rod 92 will be disposed in an opening 130 formed in the wedge lock piston structure. Such upper position results from the introduction of fluid through a wedge release passage 131 in the lower cylinder head 122 into the lower cylinder 120a, which forces the piston 124 upwardly against a compression spring 132 bearing against the cylinder head 121.

When the dog piston 80 has been shifted to the inward position illustrated in FIG. 3, the spring 132 can shift the wedge lock piston structure 124 in a downward direction, fluid under pressure being introduced through the upper wedge lock passage 133 in the cylinder head 121 into the upper cylinder 120b, forcing the wedge lock piston structure downwardly and causing an inclined or cam surface 134 on the piston structure to engage a companion inclined or cam surface 135 on the outer end of the outer piston rod 92 to urge the piston structure 80 in an inward direction and exert an additional inward force on the lock dog 50, causing its tapered cam surface 110 to exert an additional force against the companion cam pin surfaces 58 and applying a greater axial load on the pin to force its upper end 23 more firmly into engagement with the box shoulder 13. The inclined cam surfaces 134, 135 on the wedge lock piston and the outer piston rod are disposed at a small angle of taper to the axis of the piston to provide a self-locking angle between the piston 124 and outer piston rod 92, in order that the relieving of pressure in the cylinders 120b and 96 will not permit the dog 50 and its associated piston structure 80 to shift outwardly and inadvertently unlock each dog from the pin 11 and the pin from the box 10.

Figure 6:
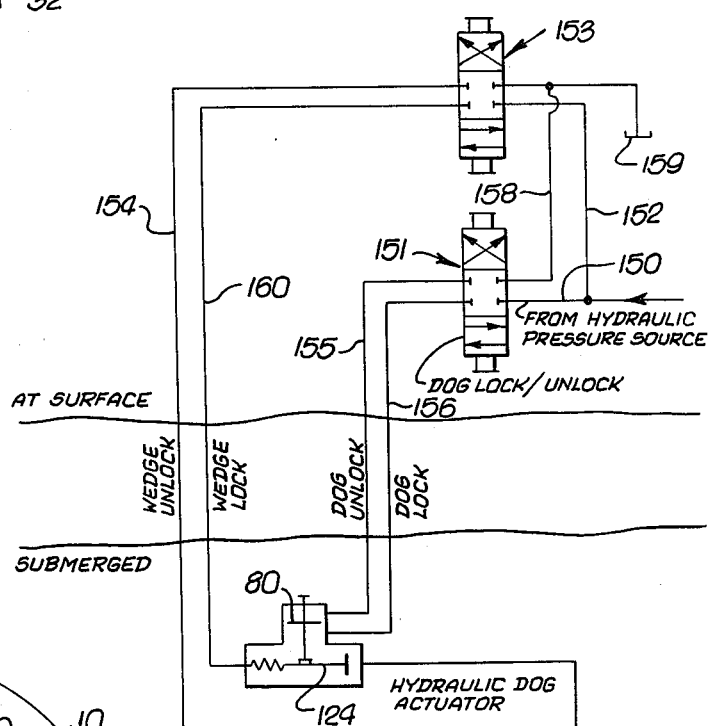
FIG. 6 is a diagrammatic view of a hydraulic circuit for effecting locking and unlocking of the pin and box from one another.
Figure 2:
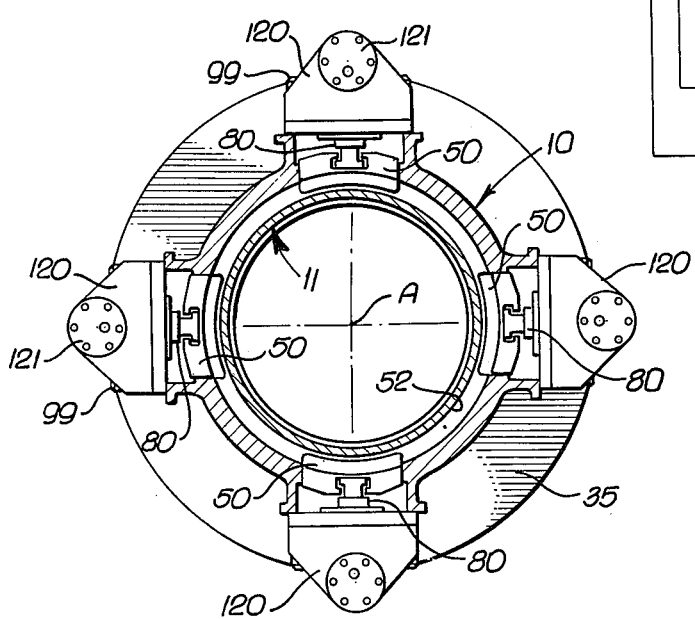
FIG. 2 is a cross-section taken along the line 2—2 of FIG. 1, parts being shown in elevation.

A hydraulic system for operating the apparatus is illustrated in FIG. 6. Fluid under pressure, such as hydraulic fluid, is derived from a suitable source (not shown) and passes through the tubular pressure line 150 leading to the latch dog lock and unlock valve 151, and through another line 152 to a wedge lock and unlock valve 153. Each of these valves can be of any suitable type, such as a manually operable, three-position, four-way valve, having a shiftable valve piston therein. In the position disclosed in FIG. 6, both valves are in fully inoperable positions. The wedge valve 153 is movable downwardly with respect to the position disclosed in FIG. 6, which will cause the hydraulic fluid under pressure to flow through suitable lines 152, 154 and through the wedge release passages 131 into the lower cylinder portions 120a of the wedge cylinder structures, effecting upward shifting of the wedge pistons 124 to the position disclosed in FIG. 5. The dog lock valve 151 can be suitably manipulated, as by shifting its valve piston in a downward direction, such that the hydraulic fluid under pressure will flow through suitable lines 150, 155 through the dog unlock or release passage 94, which will shift the dog actuating piston structures 80 in their outward direction and fully retract the lock dogs 50 within the confines of the connector box 10.

The box 10 can then be shifted over its companion pin 11 and the dog lock valve 151 then shifted in the opposite direction so that the hydraulic fluid under pressure then flows through tubular dog lock lines 156 and through the dog lock passages 95 into the outer cylinder portion 96, shifting the piston structures 80 inwardly and the dogs 50 inwardly to the locking position illustrated in FIG. 3. At this time, the valve 151 will be positioned such that any fluid in each other cylinder portion 93 can flow through the tubular lines 155, 158 and valve to a hydraulic fluid reservoir or sump 159. The piston of the wedge-lock valve mechanism 153 can then be shifted upwardly so that the fluid under pressure will flow through the tubular lines 152, 160 and through the wedge lock passage 133 into the upper cylinder portions 120b, shifting the wedge pistons 124 downwardly and into their wedge condition illustrated in FIG. 3, thereby effecting a firm wedging relation between the dogs 50 and the pin 11, and also the firm thrust between the end 23 of the pin and the box shoulder 13. During the shifting of the wedge piston 124 to its wedging position, fluid in the lower wedge cylinder 120a can pass through the other tubular line 154 back to the reservoir or sump 159.

When it is desired to release the dogs 50 from the pin 11, the piston of the wedge lock valve 153 is shifted downwardly so that fluid under pressure passes through the wedge release passages 131 into the lower cylinders 120a to shift the wedge pistons upwardly, or to the position illustrated in FIG. 5, whereupon the piston of the dog lock valve is shifted downwardly to effect retraction of the pistons and the dogs to the position illustrated in FIG. 5, in which the pin and box can be moved axially with respect to each other to their fully disconnected and disassembled condition.

In FIG. 7, another specific hydraulic circuit is illustrated diagrammatically, which represents a sequential system for actuating each dog piston 80 and the wedge piston 124. A three-position, four-way manual valve 170 is provided which will control the fluid of the hydraulic fluid under pressure to various cylinder portions, as well as permit the fluid to bleed from various cylinder portions to a sum or reservoir 159. To insure the full release of the dogs 50 from the pins 11, as represented in FIG. 5, the manually operated valve 170 is shifted upwardly, as disclosed in the diagram, so that the fluid pressure flows through a suitable tubular line 171 to the wedge release passage 131 of each wedge cylinder 120. The same fluid under pressure also flows through a pressure sequence valve 172, of any known type, which is pressure operated to an open position by the fluid pressure flowing through a bypass line 173 into the valve which will shift it downwardly against the force of the spring 174, permitting fluid to flow through the dog unlock tubular line 175 and through the dog release passage 94 for the purpose of insuring that the piston structure 80 and dogs 50 have been moved to their maximum exent outwardly from the pin 11.

When the pin 11 and box 10 are to be secured to each other, the manual valve 170 is shifted in the opposite direction, such that the tubular lines 171, 175 are then connected to the sump or reservoir 159. The hydraulic fluid under pressure then flows through the lock line 180 and through the dog lock passage 95 in each connector into the cylinder space 96 to shift each dog 50 radially inwardly into the lock position disclosed on FIG. 3. At the same time, the fluid pressure is acting on another pressure sequence valve 181 to shift it downwardly (as shown in the drawings) against the force of the spring 174 to its open position, permitting the fluid under pressure to pass through the wedge lock line 182 and lock passages 133 to the upper cylinder portion 120b for the purpose of shifting the pistons 124 downwardly and wedging them behind the outer piston rods 92, as disclosed in FIG. 3.

When the manual valve 170 is shifted upwardly, as seen in FIG. 7, the fluid in the dog lock and wedge lock cylinder portions 96, 120a can bleed from the wedge release passage 133 and the dog lock passage 95 around the sequential valve 181 through the check valve 190 and by-pass line 190a to the reservoir 159, the sequential valve having been reshifted by its spring 174 to its closed position. Similarly, when the manual valve 170 has been shifted downwardly, the pressure sequence valve 172 and the dog unlock and wedge unlock cylinders 93, 120a will have been connected to the sump or reservoir 159, the fluid under pressure being allowed to bleed through the wedge release passage 131 and the dog release passage 94. Here again, the pressure sequence valve 172 will also be connected to the reservoir 159, its spring 174 having shifted it to its closed position, whereupon the fluid can bleed from the dog unlock cylinder space 94 through the line 175, bypass line 190a and the check valve 190 therein.

I claim:

1. A connector comprising a tubular pin member, a tubular box member telescopically disposed over said pin member, lock means shiftable laterally of said box member and pin member for securing said members to each other, fluid operated shifting means for shifting means for shifting said lock means laterally of said pin member and box member, and separate means engaging said fluid operated shifting means for retaining said lock means in position securing said members to each other.

2. A connector as defined in claim 1; said fluid operated shifting means being constructed and arranged to shift said lock member in one direction laterally of said pin member and box member to secure said members to each other and in another direction laterally of said pin member and box member to release said members from each other, said separate retaining means being fluid operated acting on said fluid operated shifting means to retain said lock means in position securing said members to each other.

3. A connector comprising a tubular pin member, a tubular box member telescopically disposed over said pin member, lock means shiftable laterally of said box member and pin member for securing said members to each other, fluid operated shifting means for shifting said lock means laterally of said pin member and box member; and means shiftable lengthwise of said box member and pin member and engageable with said fluid operated shifting means to retain said lock means in position securing said members to each other.

4. A connector as defined in claimed 1; said fluid operated shifting means being constructed and arranged to shift said lock member in one direction laterally of said pin member and box member to secure said members to each other and in another direction laterally of said pin member and box member to release said members from each other, said fluid operated retaining means being shiftable lengthwise of said box member and pin member and engageable with said fluid operated shifting means to retain said lock means in position securing said members to each other.

5. A connector comprising a tubular pin member, a tubular box member telescopically disposed over said pin member, lock means shiftable laterally of said box member and pin member for securing said members to each other, fluid operated shifting means for shifting said lock means laterally of said pin member and box member; said fluid operated shifting means being carried by said box member and being constructed and arranged to shift said lock means in one direction laterally of said pin member and box member to secure said members to each other and in the other direction laterally of said pin member and box member to release said members from each other, said lock means being carried by said box member and being shiftable laterally toward said pin member to secure said members to each other, and separate fluid operated retaining means carried by said box member and acting on said fluid operated shifting means to retain said lock means in position securing said members to each other.

6. A connector as defined in claim 5; said fluid operated retaining means being shiftable lengthwise of said box member and pin member and engageable with said fluid operated shifting means to retain said lock means in position securing said members to each other.

7. A connector comprising a tubular pin member, a tubular box member disposed over said pin member, lock means for securing said members to each other, said lock means including one or more dogs on said box member shiftable laterally of said box member and pin member, first cylinder means carried by said box member, first piston means shiftable in said first cylinder means and engageable with said one or more dogs to shift said one or more dogs laterally of said box member and pin member, and first conducting means for conducting fluid under pressure into said first cylinder means to actuate said first piston means, second cylinder means carried by said box member, second piston means shiftable in said second cylinder means and engaging said first piston means to retain said one or more dogs laterally inwardly of said box member, and second conducting means for conducting fluid under pressure into said second cylinder means to actuate said second piston means.

8. A connector as defined in claim 7; said second conducting means conducting fluid under pressure to different portions of said second cylinder means to selectively shift said second piston means to position retaining said first piston means and said dogs laterally inwardly of said box member or to a position releasing said first piston means for movement laterally outwardly of said box member.

9. A connector as defined in claim 7; said second piston means including a wedge portion adapted to be wedged against said first piston means to retain said one or more dogs locked laterally inwardly of said box member.

10. A connector as defined in claim 8; said second piston means including a wedge portion adapted to be wedged against said first piston means to retain said one or more dogs laterally inwardly of said box member.

11. A connector comprising a tubular pin member, a tubular box member telescopically disposed over said pin member, lock means shiftable laterally of said box member and pin member for securing said members to each other, means for shifting said lock means laterally of said pin member and box member, and retaining means movable lengthwise of said box member and pin member and engageable with said shifting means for retaining said lock means in position securing said members to each other.

12. A connector as defined in claim 11; said lock means being carried by said box member and shiftable laterally toward said pin member to secure said members to each other, said shifting means and retaining means being carried by said box member.

13. A connector as defined in claim 11; said retaining means including a wedge portion adapted to wedge against said shifting means to retain said lock means in position securing said members to each other.

14. A connector as defined in claim 11; said lock means being carried by said box member and shiftable laterally toward said pin member to secure said members to each other, said shifting means and retaining means being carried by said box member, said retaining means including a wedge adapted to wedge against said shifting means to retain said shifting means laterally inwardly of said box member.

15. A connector as defined in claim 11; said lock means including one or more dogs shiftable laterally of said box member and pin member.

16. A connector as defined in claim 11; said lock means being carried by said box member and shiftable laterally toward said pin member to secure said members to each other, said shifting means and retaining means being carried by said box member, said lock means including one or more dogs shiftable laterally of said box member and pin member.

17. A connector as defined in claim 11; said retaining means including a wedge portion adapted to wedge against said shifting means to retain said lock means in position securing said members to each other, said lock menas including one or more dogs shiftable laterally of said box member and pin member.

18. A connector as defined in claim 11; said lock means being carried by said box member and shiftable laterally toward said pin member to secure said members to each other, said shifting means and retaining means being carried by said box member, said retaining means including a wedge adapted to wedge against said shifting means to retain said shifting means laterally inwardly of said box member, said lock means including one or more dogs shiftable laterally of said box member and pin member.

* * * * *